US012643166B2

(12) United States Patent
Robert et al.

(10) Patent No.: US 12,643,166 B2
(45) Date of Patent: Jun. 2, 2026

(54) HEAT EXCHANGER WITH A FLUID FLOW TUBE AND PROTECTION AGAINST MICROMETEORITES

(71) Applicant: LIEBHERR-AEROSPACE TOULOUSE SAS, Toulouse (FR)

(72) Inventors: Julien Robert, Toulouse (FR); Stéphane Meunier, Toulouse (FR); Arnaud Ramousse, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 203 days.

(21) Appl. No.: 18/218,256

(22) Filed: Jul. 5, 2023

(65) Prior Publication Data

US 2024/0001469 A1     Jan. 4, 2024

(51) Int. Cl.
| | |
|---|---|
| *F28F 1/20* | (2006.01) |
| *B23K 1/00* | (2006.01) |
| *F28F 21/08* | (2006.01) |
| *B23K 101/14* | (2006.01) |

(52) U.S. Cl.
CPC .............. B23K 1/0012 (2013.01); F28F 1/20 (2013.01); F28F 21/083 (2013.01); F28F 21/084 (2013.01); B23K 2101/14 (2018.08); F28F 2275/04 (2013.01)

(58) Field of Classification Search
CPC .... B23K 1/00; B23K 1/0012; B23K 2101/14;
F28F 1/20; F28F 21/08; F28F 21/083;
F28F 21/084; F28F 2275/045; F28F
225/16; F28F 2275/04; F28D 1/053;
F28D 2021/0021
See application file for complete search history.

(56) References Cited

U.S. PATENT DOCUMENTS

| | | | | |
|---|---|---|---|---|
| 3,156,950 | A * | 11/1964 | Walton, Jr. ............. | D01D 4/022 |
| | | | | 425/464 |
| 2017/0205063 | A1* | 7/2017 | Kadijk ............... | H10H 20/8582 |
| 2020/0103172 | A1* | 4/2020 | Martini ................... | B23P 15/26 |
| 2020/0355443 | A1* | 11/2020 | Tochigi .............. | F28D 15/0275 |

FOREIGN PATENT DOCUMENTS

| | | | | |
|---|---|---|---|---|
| CN | 201985161 U | * | 9/2011 | |
| CN | 105593626 A | * | 5/2016 | ............. F28D 15/02 |

* cited by examiner

*Primary Examiner* — Harry E Arant
(74) *Attorney, Agent, or Firm* — CRGO Global; Steven M. Greenberg

(57) ABSTRACT

A heat exchanger includes a fluid flow tube configured to allow an exchange of heat between the fluid flowing in the tube and an enclosure surrounding the tube. The enclosure is formed from two profiled bars configured to surround the tube over at least one part of its length. Each of the bars includes a recess adapted to receive the tube, and a joint surface configured to form a joint with the other profiled bar. The joint surfaces of the profiled bars form a gap therebetween. As well, the joint surfaces of the profiled bars are arranged in different planes such that the gap forms at least one baffle on each side of the tube.

11 Claims, 2 Drawing Sheets

[Fig. 1]
[Fig. 2]
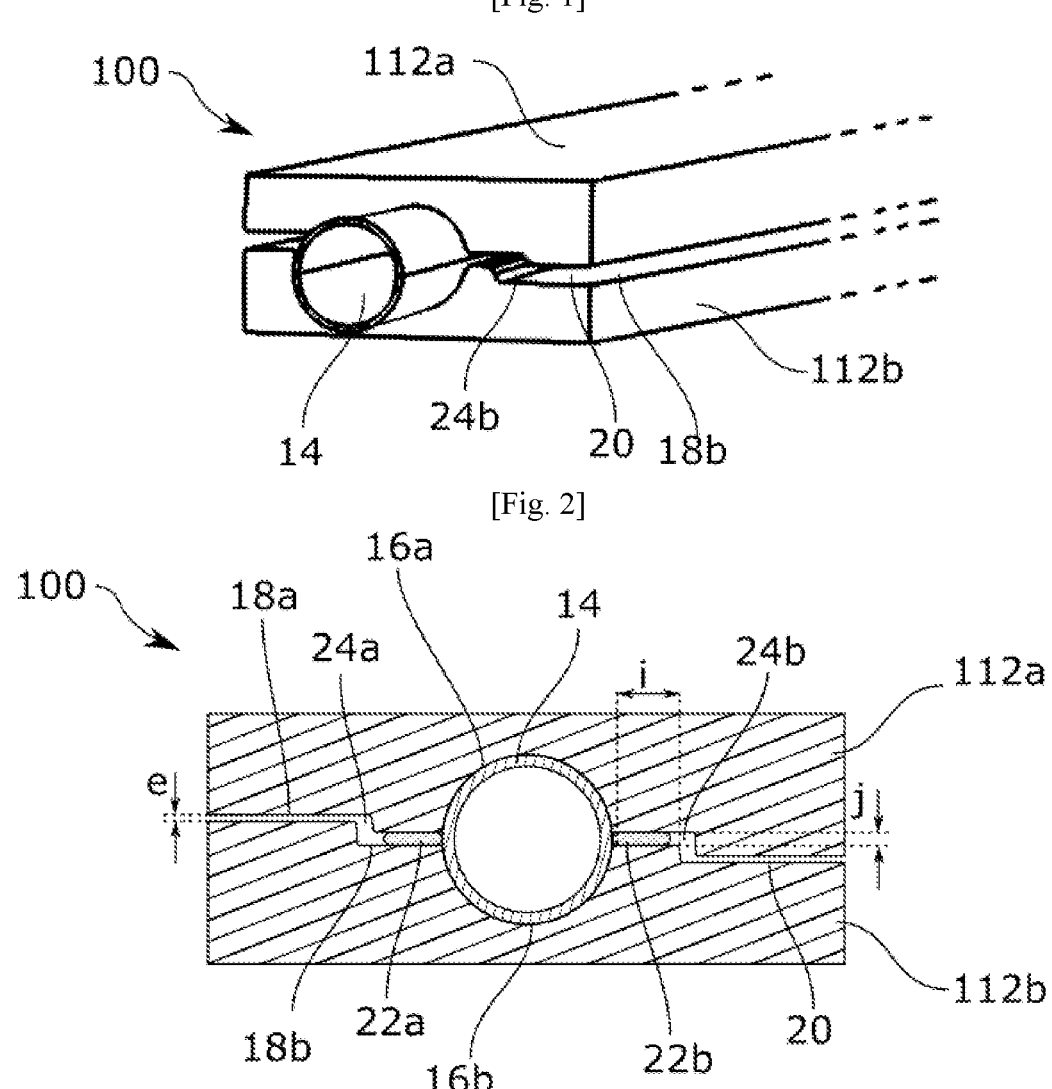

[Fig. 3]
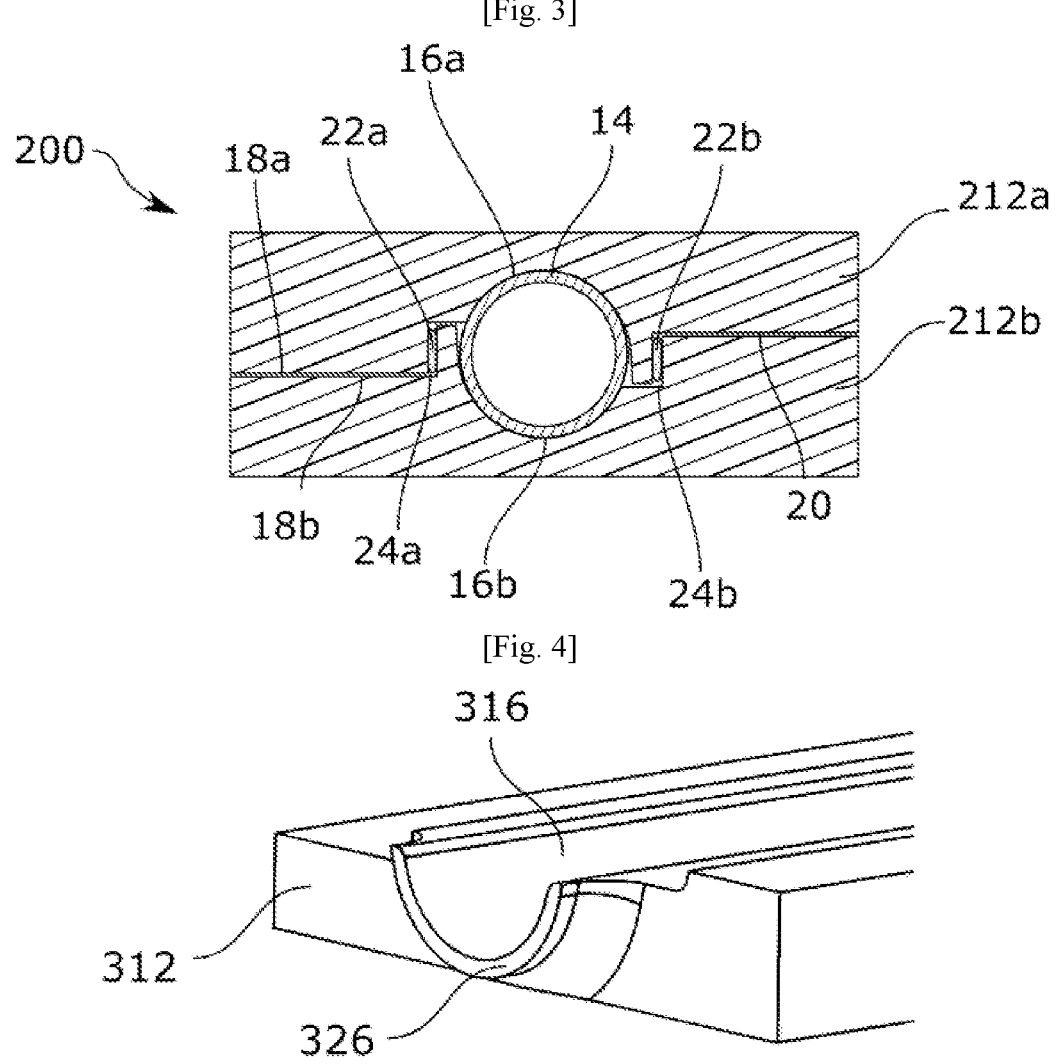
[Fig. 4]

HEAT EXCHANGER WITH A FLUID FLOW TUBE AND PROTECTION AGAINST MICROMETEORITES

CROSS REFERENCE TO RELATED APPLICATIONS

This application claims priority under 35 U.S.C. § 119(a) to France patent application 2206786 filed on Jul. 4, 2022, the entire teachings of which are incorporated herein by reference.

BACKGROUND OF THE INVENTION

Field of the Invention

The present invention relates a heat exchanger and a method of manufacturing said exchanger. In particular, the invention relates to a heat exchanger able to be of the type made from stainless steel and aluminum or other combinations of two materials for use in an aeronautical or space context.

Description of the Related Art

The heat exchangers used in the aeronautical or space field can be in the form of an enclosure, preferably made of aluminum, surrounding a tube, preferably made of stainless steel, in which a fluid flows, in particular for a transfer of heat from the fluid towards the outside of the enclosure via the tube and the enclosure.

The exchanger is generally assembled by soft soldering or welding of the enclosure with the tube arranged in said enclosure.

The use of soft soldering or welding to assemble the exchanger involves a number of disadvantages.

The main disadvantage of assembly by soft soldering or welding is a difficulty of making the production of a number of parts possible on an industrial scale.

To overcome these problems, the inventors have sought to use hard soldering which would make it possible to facilitate the production of the exchanger on an industrial scale owing to the use of a furnace. However, the use of hard soldering causes problems associated with the higher temperature of hard soldering, which is generally greater than 600° C. compared with less than 450° C. for soft soldering.

In particular, the assembly by soldering of elements made of two materials of different natures generates differential expansions between the two materials owing to their different coefficients of thermal expansion, which can cause cohesion failure in the heat exchanger owing to the soldering. This can jeopardize the mechanical aspect of the exchanger and specific solutions must be implemented in order to manage these thermal stresses during soldering.

Furthermore, the use of such an exchanger in the space field requires providing the fluid flow tube with protection against micrometeorites which could cause degradation of said tube, even causing a leakage of the fluid if the tube is pierced.

BRIEF SUMMARY OF THE INVENTION

The inventors have thus sought a solution enabling the mechanical aspect of the exchanger, the management of these thermal stresses during soldering and the protection of the tube against micrometeorites to be guaranteed. As such, the invention aims to provide a heat exchanger and a method of manufacturing said exchanger.

The invention aims in particular to provide, in at least one embodiment, an exchanger assembled in a way which is simple and can be achieved on an industrial scale.

The invention also aims to provide, in at least one embodiment of the invention, a heat exchanger adapted to the thermal stresses of hard soldering.

The invention also aims to provide, in at least one embodiment of the invention, a heat exchanger including protection of the fluid flow tube against the impacts of micrometeorites.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

To this end, the invention relates to a heat exchanger including a fluid flow tube and configured to allow an exchange of heat between the fluid flowing in the tube and an enclosure surrounding the tube, characterized in that the enclosure is formed of two profiled bars configured to surround the tube over at least one part of its length, each including:

a recess intended to receive the tube, the inner surface of the recess being a portion of a cylinder, a joint surface distributed on either side of the recess and configured to form a joint with the other profiled bar following soldering of the bars, and in that the joint surfaces of the profiled bars are complementary in shape so as to form a gap therebetween, at least one soldering element being arranged in at least one part of said gap, and the joint surfaces of the profiled bars are arranged in different planes such that said gap forms at least one baffle on each side of the tube.

An exchanger in accordance with the invention is thus suitable for hard soldering by the use of two bars arranged around the tube and separated by a gap which makes it possible to reduce the thermal stresses during soldering, in particular to avoid deformation of the exchanger. In particular, the presence of a bar on each side of the tube makes it possible to reduce the "bimetal" effect when the tube and the bars are made from different materials having different coefficients of thermal expansion.

Hard soldering is preferably vacuum hard soldering, in particular using a vacuum soldering furnace. The soldering element is advantageously created by the soldering of a soldering strip inserted in at least one part of the gap during production of the heat exchanger. "Soldering element" is understood to mean more generally the result of the soldering of any filler element making possible the permanent joint between the profiled bars or between each profiled bar and the flow tube.

The presence of the baffle makes it possible to facilitate assembly, to reduce the risks of static indeterminacy when fixing the two profiled bars to the tube, and within the scope of using the heat exchanger in the space field to offer protection of the tube against micrometeorites by removing any direct path from the exterior of the heat exchanger to the tube. The micrometeorites flowing in the gap are stopped or at least slowed at the baffle, which makes it possible to greatly or completely (depending upon the dimensions of the baffle) reduce the risk of the tube being pierced.

According to a variant of the invention, at least some of the soldering can be implemented by prior application of a metallized layer to the tube before it is assembled with the bars, then soldering of the assembled exchanger. The metallized layer is for example nickel (added by nickel plating) and is preferably applied by cold spraying, and the final soldering makes it possible to form the solder joint between the tube and the recesses of the bars. Furthermore, the soldering makes it possible to improve the heat exchange between the tube and the profiled part.

The bars are e.g. manufactured by extrusion, and are preferably made of aluminum. The tube is preferably made of stainless steel. The exchanger is thus referred to as an "aluminum/stainless steel" heat exchanger. Other materials may be used.

Surface treatment of the tube or of the bars is possible, in particular prior to assembly of the exchanger or after assembly, e.g. an SAO (sulfuric anodic oxidation) treatment, TCS PACS, physical vapor deposition, PVD, treatment and chemical vapor deposition, CVD, treatment.

Advantageously and in accordance with the invention, at least one soldering element is further arranged between the flow tube and each recess of the profiled bars.

According to this aspect of the invention, the presence of soldering between the tube and the profiled bars makes it possible to increase the thermal exchanges between these two elements of the heat exchanger, thereby improving the overall performance of the heat exchanger.

Advantageously and in accordance with the invention, at least one profiled bar includes cooling fins.

According to this aspect of the invention, the cooling fins make it possible to increase the thermal exchange with the exterior in order to improve the performance of the heat exchanger.

Advantageously and in accordance with the invention, the two profiled bars are substantially straight and identical and are assembled such that one profiled bar is rotated by 180° about a main axis of the flow tube with respect to the other profiled bar.

According to this aspect of the invention, manufacturing of the profiled bars is simplified because the bars are identical. Rotation of one bar with respect to the other enables the assembly of the two pieces and forms the baffle at the gap.

Advantageously and in accordance with the invention, the profiled bars extend in a main longitudinal direction and include, at each of their ends, a transition zone in the form of lips.

According to this aspect of the invention, the transition zone makes it possible to limit the concentrations of residual thermomechanical stresses between the tube and the profiled bars at the ends of the heat exchanger, in particular at the ends of the profiled bars.

The invention also relates to a method of manufacturing a heat exchanger in accordance with the invention, characterized in that it includes:

a step of placing at least one soldering strip on at least one part of the joint surface of at least one profiled bar, a step of inserting the fluid flow tube in at least one recess of one of the profiled bars, a step of joining the two profiled bars around the tube, a step of hard soldering the heat exchanger in a soldering furnace at a temperature greater than 450° C., preferably greater than 600° C., such that each soldering strip forms a permanent assembly between the bars and the tube.

A method in accordance with the invention can easily be implemented on an industrial scale owing to the use of a soldering furnace, in particular a vacuum soldering furnace, which replaces the human operator for soft soldering. The method is also simpler, less expensive, more reliable and reproducible. The use of the vacuum soldering furnace also makes it possible to have a greater choice of materials for the heat exchanger, in particular for the fluid flow tube, reduces oxidation, produces less pollutants and enables greater local control of the temperature because the heat is transmitted by radiation.

Advantageously and according to a variant of the invention, the method of manufacture includes a preliminary step of applying a metallized layer to the tube, the metallized layer forming a solder joint between the tube and the recesses of the profiled bars.

The invention also relates to a heat exchanger and a method of manufacture which are characterized in combination by all or some of the features mentioned above or below.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic perspective view of a heat exchanger in accordance with a first embodiment of the invention;

FIG. 2 is a schematic cross-sectional view of the heat exchanger in accordance with a first embodiment of the invention;

FIG. 3 is a schematic cross-sectional view of a heat exchanger in accordance with a second embodiment of the invention;

FIG. 4 is a schematic perspective view of a profiled bar of a heat exchanger in accordance with one embodiment of the invention.

DETAILED DESCRIPTION OF THE INVENTION

FIG. 1 and FIG. 2 show schematic perspective and cross-sectional views of a heat exchanger 100 in accordance with a first embodiment of the invention.

The exchanger 100 includes a fluid flow tube 14, the exchanger 100 being configured to allow an exchange of heat between the fluid flowing in the tube and an enclosure surrounding the tube. The enclosure is formed of two profiled bars, referred to as upper bar 112a and lower bar 112b, which are substantially identical and configured to surround the tube 14 in at least one part of its length, each including a recess 16a, 16b intended to receive the tube 14, the inner surface of the recess being a portion of a cylinder.

Each bar also includes a joint surface 18a, 18b distributed on either side of the recess, on the left and right of the tube 14 in FIG. 2, and configured to form a joint with the other profiled bar following soldering of the bars.

The joint surfaces of the profiled bars are complementary in shape so as to form a gap 20 therebetween, at least one soldering element, in this case two soldering elements 22a, 22b, being arranged in at least one part of said gap 20. Soldering elements, not shown, are also present between the flow tube 14 and the profiled bars at the recesses 16a, 16b.

The joint surfaces 18a, 18b of the profiled bars are arranged in different planes such that said gap 20 forms at least one baffle 24a, 24b on each side of the configured tube, so as to protect the tube 14 from possible micrometeorites entering the gap 20 from the outside. The baffles prevent any direct path from the exterior of the exchanger to the flow tube via the gap.

The thickness e of the gap is for example of the order of 0.25 mm. At the soldering element, a clearance j, for example between 0.25 mm and 1 mm, and a spacing i, for example at least equal to 1 mm, allows the insertion, during manufacturing, of the soldering strip making it possible to form the soldering element. In these figures and the following figures, these thicknesses may not be to scale so that the gap and the clearance can be seen.

FIG. 3 shows a schematic cross-sectional view of a heat exchanger 200 in accordance with a second embodiment of the invention. In this embodiment, the upper bar 212a and the lower bar 212b have geometric shapes which are identical to each other but different from the profiled bars of the first embodiment. The gap 20, the baffles 24a and 24b as well as the soldering elements 22a, 22b are present with identical functions but different shapes. These shapes can, for example, make it possible to increase the soldering surface between the two bars or between each bar and the tube so as to maximize the thermal exchange and/or make it possible to guarantee that no micrometeorite can reach the tube.

FIG. 4 is a schematic perspective view of a profiled bar 312 of a heat exchanger in accordance with one embodiment of the invention. The bar 312 includes, at at least one of these ends, at the recess 316 intended to accommodate the fluid flow tube, a lip-shaped transition zone 326 allowing the accommodation of the fluid flow tube to be extended to the end whilst limiting the residual thermomechanical stresses.

The invention is not limited to the embodiments described. In particular, the profiled bars can be of different shapes. In particular, the baffle can have different shapes depending upon the stresses of the heat exchanger, for example stresses related to manufacturing, assembly and/or protection against micrometeorites.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. To wit, in the figures, for the purposes of illustration and clarity, scales and proportions have not been strictly respected. In particular, the gaps of the exchanges are shown so as to be visible but can be narrower than that shown.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A heat exchanger comprising a fluid flow tube configured to allow an exchange of heat between the fluid flowing in the tube and an enclosure surrounding the tube, wherein the enclosure is formed of two profiled bars configured to surround the tube over at least one part of its length, each of the bars comprising:
    a recess adapted to receive the tube, the inner surface of the recess being a portion of a cylinder,
    a joint surface distributed on either side of the recess and configured to form a joint with an other one of the bars following soldering of the profiled bars,
    wherein the joint surfaces of the profiled bars are complementary in shape so as to form a gap therebetween, at least one soldering element being arranged in at least one part of said gap, and the joint surfaces of the profiled bars are arranged in different planes such that said gap forms at least one baffle on each side of the tube.

2. The heat exchanger as claimed in claim 1, wherein at least one soldering element is obtained by hard soldering in a vacuum soldering furnace of a soldering strip inserted in at least one part of said gap.

3. The heat exchanger as claimed in claim 1, wherein at least one soldering element is further arranged between the flow tube and each recess of the profiled bars.

4. The heat exchanger as claimed in claim 1, wherein the enclosure is made from aluminum and the tube is made from stainless steel.

5. The heat exchanger as claimed in claim 1, wherein the profiled bars are made by extrusion.

6. The heat exchanger as claimed in claim 1, wherein at least one profiled bar comprises cooling fins.

7. The heat exchanger as claimed in claim 1, wherein the two profiled bars are substantially straight and identical and are assembled such that one profiled bar is rotated by 180° about a main axis of the flow tube with respect to the other profiled bar.

8. The heat exchanger as claimed in claim 1, wherein the profiled bars extend in a main longitudinal direction and comprise, at each of their ends, a transition zone in the form of lips.

9. A method of manufacturing a heat exchanger comprising:
    placing at least one soldering strip on at least one part of a joint surface of at least one profiled bar amongst two profiled bars defining an enclosure of a fluid flow tube of a heat exchanger, each of the bars comprising a recess adapted to receive the tube, the inner surface of the recess being a portion of a cylinder, and a joint surface distributed on either side of the recess, inserting the fluid flow tube in the recess of one of the profiled bars, joining the two profiled bars around the tube, hard soldering the heat exchanger in a soldering furnace at a temperature greater than 450° C., such that each soldering strip produced by the hard soldering forms a permanent assembly between the profiled bars and the fluid flow tube, so that each joint surface is configured to form a joint with an other one of the bars following soldering of the profiled bars, the joint surfaces of the profiled bars being complementary in shape so as to form a gap therebetween and being arranged in different planes such that said gap forms at least one baffle on each side of the tube.

10. The method of manufacture as claimed in claim 9, further comprising a preliminary step of applying a metallized layer to the tube, the metallized layer forming a solder joint between the tube and the recesses of the profiled bars.

11. The method of manufacture as claimed in claim 9, wherein the hard soldering of the heat exchanger in a soldering furnace is performed at a temperature greater than 600° C.

* * * * *